US011407412B2

(12) United States Patent
Mizoguchi

(10) Patent No.: US 11,407,412 B2
(45) Date of Patent: Aug. 9, 2022

(54) AUTOMATIC DRIVING ASSIST APPARATUS FOR VEHICLE

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 148 days.

(21) Appl. No.: 16/879,119

(22) Filed: May 20, 2020

(65) Prior Publication Data
US 2021/0024065 A1  Jan. 28, 2021

(30) Foreign Application Priority Data

Jul. 24, 2019  (JP) .............................. JP2019-136010

(51) Int. Cl.
| | |
|---|---|
| *B60W 30/12* | (2020.01) |
| *B60W 30/18* | (2012.01) |
| *B60W 40/06* | (2012.01) |
| *G05D 1/02* | (2020.01) |

(52) U.S. Cl.
CPC ...... *B60W 30/12* (2013.01); *B60W 30/18163* (2013.01); *B60W 40/06* (2013.01); *G05D 1/0212* (2013.01); *B60W 2520/06* (2013.01); *B60W 2552/53* (2020.02); *B60W 2554/801* (2020.02)

(58) Field of Classification Search
CPC ............. B60W 40/06; B60W 2552/53; B60W 2554/801; G05D 1/0212; G01C 21/3644
See application file for complete search history.

(56) References Cited

U.S. PATENT DOCUMENTS

| | | | | |
|---|---|---|---|---|
| 2014/0229068 | A1* | 8/2014 | Ueyama | B60W 10/20 701/41 |
| 2015/0367778 | A1* | 12/2015 | Vladimerou | G06K 9/00798 348/148 |
| 2017/0248959 | A1* | 8/2017 | Matsubara | B60W 10/04 |
| 2018/0128635 | A1 | 5/2018 | Nakamura et al. | |
| 2018/0211533 | A1* | 7/2018 | Nakajima | G08G 1/096855 |
| 2021/0309231 | A1* | 10/2021 | Fujita | G01C 21/3407 |
| 2021/0331671 | A1* | 10/2021 | Kumano | G01S 17/42 |
| 2022/0135039 | A1* | 5/2022 | Jardine | B60W 30/18159 701/26 |

FOREIGN PATENT DOCUMENTS

| | | | | |
|---|---|---|---|---|
| JP | 2003035541 A | * | 2/2003 | |
| JP | 2017165184 A | * | 9/2017 | |
| JP | 2018-077087 A | | 5/2018 | |
| WO | WO-2019043831 A | * | 3/2019 | ............... G06K 9/03 |

* cited by examiner

*Primary Examiner* — Jeff A Burke
*Assistant Examiner* — Jerrod Irvin Davis
(74) *Attorney, Agent, or Firm* — McDermott Will & Emery LLP

(57) ABSTRACT

An automatic driving assist apparatus for a vehicle includes: a map information storage unit; an own vehicle position estimator; a route information input unit; a traveling route setting unit; a target path setting unit configured to set a target path to a center of a traveling lane; a road condition acquirer; and an automatic driving controller. The automatic driving controller further includes a branch lane determiner and a target path lateral position change amount calculator. The target path setting unit corrects the target path with a lateral position change amount calculated by the target path lateral position change amount calculator, to set a new target path.

16 Claims, 11 Drawing Sheets

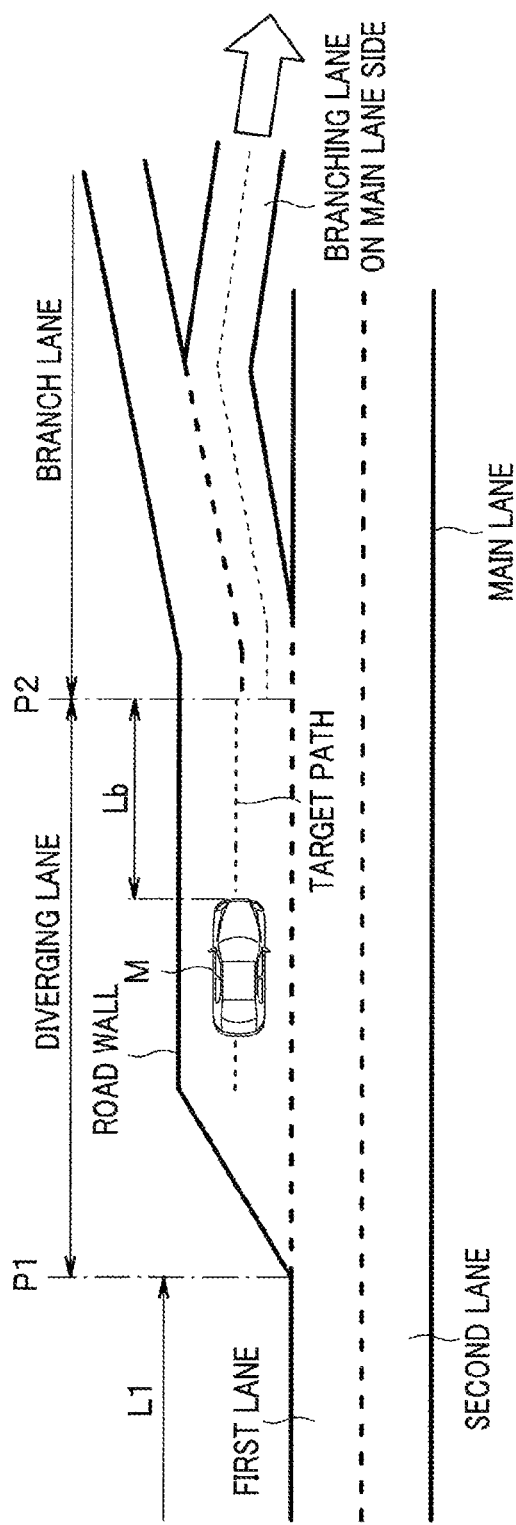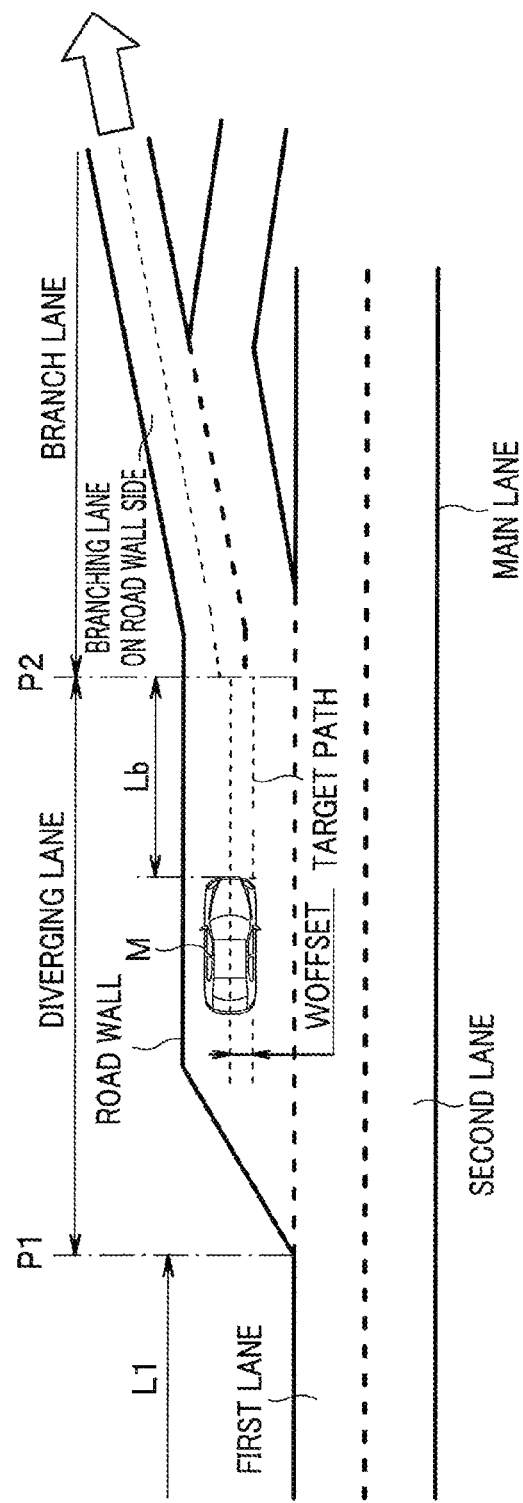

AUTOMATIC DRIVING ASSIST APPARATUS FOR VEHICLE

CROSS-REFERENCE TO RELATED APPLICATIONS

The present application claims priority from Japanese Patent Application No. 2019-136010 filed on Jul. 24, 2019, the entire contents of which are hereby incorporated by reference.

BACKGROUND

The technology relates to an automatic driving assist apparatus for vehicle. In details, when a target path along which an own vehicle is caused to travel automatically is set to one of branching lanes of a bifurcated branch lane via a diverging lane where two lanes are not clearly sectionalized, the automatic driving assist apparatus for vehicle of the technology allows the own vehicle to smoothly pass through the diverging lane to enter into one of the branching lanes.

An automatic driving assist apparatus mounted on a vehicle map-matches an own vehicle position on a high-precision road map (dynamic map) based on position information received from a positioning satellite such as Global Navigation Satellite System (GNSS) satellite represented by a GPS satellite. Then, when an occupant (mainly a driver) sets a destination on the high-precision road map, the automatic driving assist apparatus constructs a traveling route connecting the own vehicle position and the destination.

After that, the automatic driving assist apparatus sets a target path for causing an own vehicle to travel automatically along the traveling route, up to a predetermined distance ahead along the traveling route ahead of the own vehicle. When the traveling route is set in a direction of a branch lane such as a junction connecting a main lane and another main lane or an exit of an interchange connected to the main lane, also the target path is set along the traveling route.

In a conventional automatic driving assist apparatus, as disclosed in Japanese Unexamined Patent Application Publication (JP-A) No. 2018-77087, for example, it is common to recognize a traveling lane (branch lane) based on an image picked up by a camera and set a target path, which is to be set in a direction of a branch lane, to the center of the recognized traveling lane.

SUMMARY

An aspect of the technology provides an automatic driving assist apparatus for a vehicle including: a map information storage unit configured to store road map information; an own vehicle position estimator configured to estimate an own vehicle position that is a current position of the own vehicle; a route information input unit configured to receive an input of information of a destination by an operation from outside; a traveling route setting unit configured to set a traveling route connecting the own vehicle position estimated by the own vehicle position estimator and the destination input from the route information input unit, on a basis of the road map information stored in the map information storage unit; a target path setting unit configured to set a target path along which the own vehicle is caused to travel by automatic driving, on the traveling route set by the traveling route setting unit such that the target path is set to a center of a traveling lane; an automatic driving controller configured to perform automatic driving while controlling a lateral position of the own vehicle such that the lateral position of the own vehicle coincides with the target path set by the target path setting unit; and a road condition acquirer configured to acquire a road condition of the traveling lane on which the target path is set. The automatic driving controller includes: a branch lane determiner configured to determine whether the target path set by the target path setting unit is set to one of branching lanes of a bifurcated branch lane; and a target path lateral position change amount calculator configured to, when the branch lane determiner determines that the target path is set to the one of the branching lanes of the bifurcated branch lane, calculate a lateral position change amount of a center in a vehicle width direction of the own vehicle relative to the target path, according to a lane width of a diverging lane connecting a main lane and the bifurcated branch lane, the lateral position change amount being a lateral position change amount on a side of the one of the branching lanes to which the target path is set. The target path setting unit corrects the target path with the lateral position change amount calculated by the target path lateral position change amount calculator, to set a new target path.

An aspect of the technology provides an automatic driving assist apparatus for a vehicle including a circuitry. The circuitry is configured to: estimate an own vehicle position that is a current position of the own vehicle; receive an input of information of a destination by an operation from outside; set a traveling route connecting the estimated own vehicle position and the input destination, on a basis of road map information stored in a map information storage unit; set a target path along which the own vehicle is caused to travel by automatic driving, on the set traveling route such that the target path is set to a center of a traveling lane; and perform automatic driving while controlling a lateral position of the own vehicle such that the lateral position of the own vehicle coincides with the set target path. The circuitry is further configured to: acquire a road condition of the traveling lane on which the target path is set; determine whether the set target path is set to one of branching lanes of a bifurcated branch lane; calculate, when determining that the target path is set to the one of the branching lanes of the bifurcated branch lane, a lateral position change amount of a center in a vehicle width direction of the own vehicle relative to the target path, according to a lane width of a diverging lane connecting a main lane and the bifurcated branch lane, the lateral position change amount being a lateral position change amount on a side of the one of the branching lanes to which the target path is set; and correct the target path with the calculated lateral position change amount, to set a new target path.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 8A is an explanatory view illustrating a traveling state on a diverging lane with a narrow lane width, in a case where the target path is set to the branching lane on the main lane side.

FIG. 8B is an explanatory view illustrating a traveling state on the diverging lane with the narrow lane width, in a case where the target path is set to the branching lane on the road wall side.

DETAILED DESCRIPTION

Figure 1:
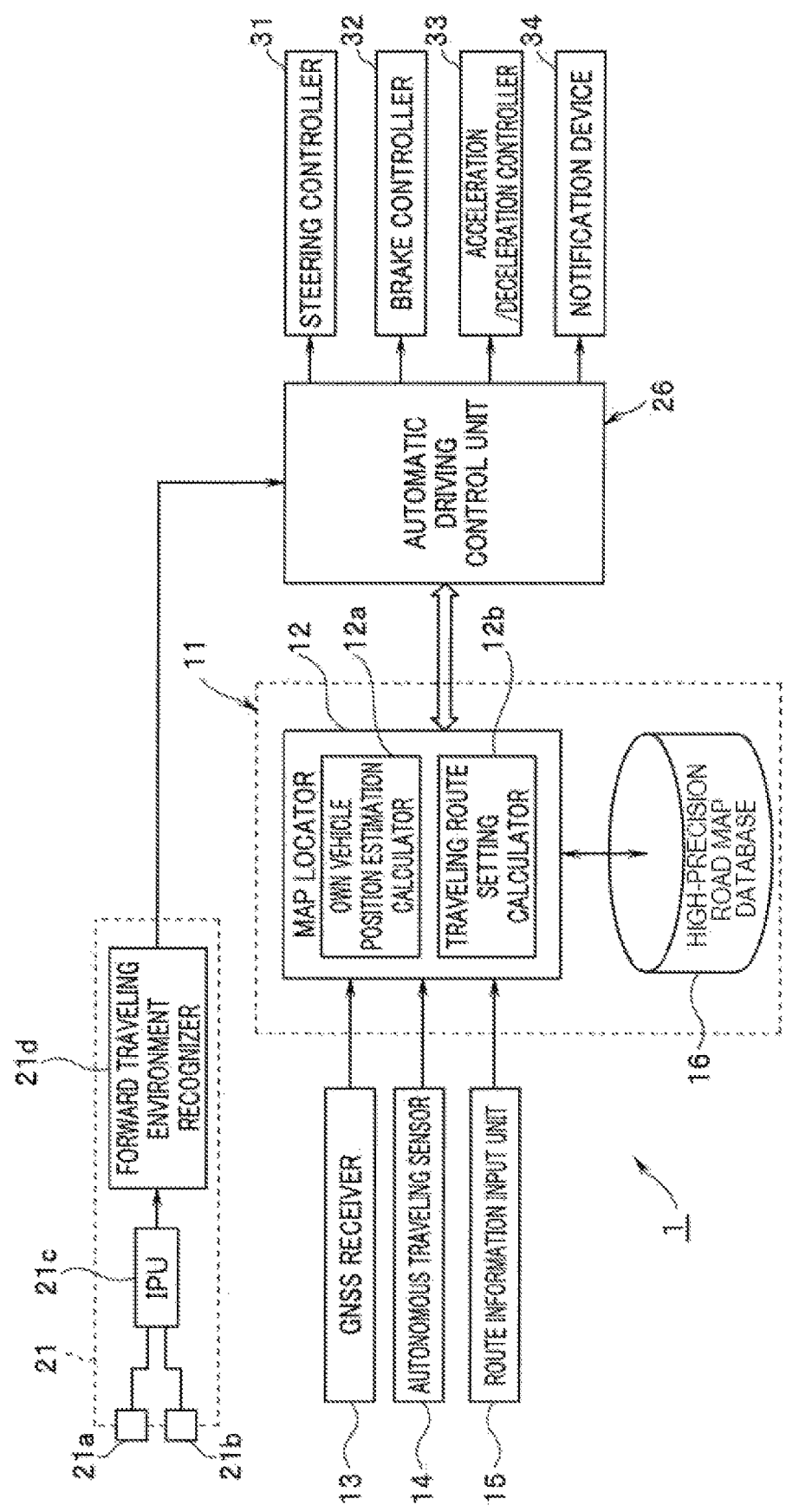
FIG. 1 is a schematic configuration diagram of an automatic driving assist apparatus.

In the technique disclosed in the above-described JP-A No. 2018-77087, when a branch lane connected to the main lane is further bifurcated into branching lanes and the branching lanes are connected respectively to other different main lanes, a diverging lane is provided between the main lane and the bifurcated branch lane. The diverging lane is provided so that an own vehicle can enter the diverging lane from the main lane, and easily change a course from a halfway of the diverging lane in the direction of a target branching lane.

Therefore, the diverging lane has a lane width wider than a width of a normal one lane, and lane markers for guiding to each of the branching lanes of the bifurcated branch lane are not clearly drawn so as to enable the course change to be easily performed in the middle of traveling. According to the technique disclosed in the above-described publication, the target path is set to the center of the traveling lane. As a result, also the target path set on the diverging lane is set to the center of the diverging lane.

However, as described above, the lane width of the diverging lane is wider than the width of the normal one lane, and furthermore, the lane markers for guiding to each of the branching lanes of the bifurcated branch lane are not clearly drawn. Therefore, the lane width of the diverging lane is recognized as the lane width of one lane, and the target path is set to the center of the diverging lane. As a result, in conventional automatic driving assist apparatuses, when an own vehicle is caused to advance to one of the branching lanes of the bifurcated branch lane from the diverging lane, the own vehicle travels on the center of the diverging lane until the lane markers of the respective branching lanes are recognized, which causes an inconvenience that traveling stability is impaired by a sudden course change when entering into the branching lane.

In addition, the traveling route is different from the one expected by a driver and an occupant, which gives an unpleasant feeling to the driver and the occupant. Furthermore, the own vehicle possibly impedes advancing of a following vehicle that is to advance to the branching lane in the direction different from the direction of the branching lane in which the own vehicle is to advance.

It is desirable to provide an automatic driving assist apparatus for vehicle that makes it possible, even if a main lane and a bifurcated branch lane are connected through a diverging lane and lane markers for guiding respectively to directions of branching lanes of the bifurcated branch lane are not clearly drawn on the diverging lane, to set an appropriate target path on the diverging lane, to stabilize a traveling performance when entering from the diverging lane into each of the branching lanes, to obtain a traveling state fit to an intention of an occupant including a driver, and not to impede advancing of a following vehicle that is to advance to the branching lane different from the branching lane to which the own vehicle is to advance.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The reference numeral 1 in FIG. 1 denotes an automatic driving assist apparatus for performing automatic driving. The automatic driving assist apparatus is mounted on an own vehicle M (see FIGS. 5A, 5B, 8A, and 8B). The automatic driving assist apparatus 1 includes a locator unit 11, a camera unit 21, and an automatic driving control unit 26 as an automatic driving controller.

The locator unit 11 includes a map locator calculator 12, and a high-precision road map database 16 as a map information storage unit. The map locator calculator 12, a forward traveling environment recognizer 21d which will be described later, and the automatic driving control unit 26 are configured by a well-known microcomputer including a CPU, a RAM, a ROM, a non-volatile storage unit and the like, and peripheral equipment thereof, and fixed data such as a program executed by the CPU, a data table and the like are stored in the ROM in advance.

A Global Navigation Satellite System (GNSS) receiver 13, an autonomous traveling sensor 14, and a route information input unit 15 as a route information input unit are coupled to an input side of the map locator calculator 12.

The GNSS receiver 13 receives positioning signals transmitted from a plurality of positioning satellites. The autonomous traveling sensor 14 enables autonomous traveling in an environment such as traveling in a tunnel in which a reception sensitivity from the GNSS satellites is low, and the positioning signals cannot be effectively received. The autonomous traveling sensor 14 includes a vehicle speed sensor, a yaw rate sensor, a longitudinal acceleration sensor, and the like.

The map locator calculator 12 performs localization from a moving distance and an azimuth, based on a vehicle speed detected by the vehicle speed sensor, a yaw rate (yaw angular velocity) detected by the yaw rate sensor, the longitudinal acceleration detected by the longitudinal acceleration sensor, and the like.

The route information input unit 15 is a terminal device operated by a driver or an occupant. The route information input unit 15 can intensively receive an input of a series of information required in setting of a traveling route by the map locator calculator 12, such as setting of a destination and a transit point (a rest area on an expressway or the like).

For example, the route information input unit 15 is an input unit of a car navigation system (a touch panel on a monitor, for example), a mobile terminal such as a smart phone, a personal computer or the like, and is coupled to the map locator calculator 12 wiredly or wirelessly.

When the driver or the occupant operates the route information input unit 15 and inputs information of the destination and the transit point (a facility name, an address, a telephone number, and the like), the input information is read by the map locator calculator 12.

When the destination and the transit point are input, the map locator calculator 12 sets the position coordinates (latitude, longitude) of the destination and the transit point. The map locator calculator 12 includes an own vehicle position estimation calculator 12a, as an own vehicle position estimator, configured to estimate an own vehicle position which is a current position of the own vehicle M, and a traveling route setting calculator 12b, as a traveling route setting unit, configured to set a traveling route from the own vehicle position to the destination (and the transit point).

In addition, the high-precision road map database 16 is a large-capacity storage medium such as an HDD in which well-known high-precision road map information (local dynamic map) is stored. The high-precision road map information has a hierarchical structure in which additional map information required for supporting automatic traveling is superposed on the lowermost static information layer which is the base.

The static information includes data indicating road conditions such as types of roads (general road, expressway, etc.), road shapes, left and right lane markers, exits of expressways and bypass roads, etc., a branch lane connected from a main lane of an expressway to a junction or a rest area, and, in a case where the branch lane is further bifurcated, the entrance and exit, the section length, and the lane width of the diverging lane connecting the main lane and the branch lane. In addition, the additional information includes dynamic information that changes moment by moment, such as traffic jam information, traffic regulation due to an accident or construction.

The own vehicle position estimation calculator 12a acquires current position coordinates (latitude, longitude) of the own vehicle M, based on the positioning signal received by the GNSS receiver 13, map-matches the position coordinates on the map information, and estimates the own vehicle position (current position) on the road map. In addition, the own vehicle position estimation calculator 12a identifies the traveling lane on the high-precision road map based on the position information, acquires the road shape of the traveling lane, to cause the non-volatile storage unit to successively store the acquired road shape. Furthermore, in an environment such as the traveling in a tunnel in which the effective positioning signals from the positioning satellites cannot be received due to a lowered sensitivity of the GNSS receiver 13, the own vehicle position estimation calculator 12a switches to an autonomous navigation and performs localization based on the information from the autonomous traveling sensor 14.

The traveling route setting calculator 12b refers to the local dynamic map stored in the high-precision road map database 16, based on the position information (latitude, longitude) of the own vehicle position estimated by the own vehicle position estimation calculator 12a and the position information (latitude, longitude) of the input destination (and the transit point). Then, the traveling route setting calculator 12b constructs, on the local dynamic map, a traveling route connecting the own vehicle position and the destination (when the transit point is set, the destination via the transit point) in accordance with the route conditions (recommended route, fastest route, and the like) set in advance.

On the other hand, the camera unit 21 is fixed to an upper center of a front part in a cabin of the own vehicle M, and includes an in-vehicle camera (stereo camera) having a main camera 21a and a sub camera 21b disposed at symmetric positions across the center in the vehicle width direction (vehicle width center), an image processing unit (IPU) 21c, and the forward traveling environment recognizer 21d. The camera unit 21 acquires reference image data with the main camera 21a and acquires comparison image data with the sub camera 21b.

Then, the both image data are processed into predetermined data in the IPU 21c. The forward traveling environment recognizer 21d reads the reference image data and the comparison image data that have been subjected to the image processing in the IPU 21c, recognizes the same one object in both of the images based on the parallax between the images, calculates distance data (distance from the own vehicle M to the object) by using the principle of triangulation, and recognizes the forward traveling environment information.

The forward traveling environment information includes a road shape (lane markers marking left and right, a road curvature 1/m at the center between the lane markers, and a width (lane width) between the left and right lane markers) of the lane (traveling lane) on which the own vehicle M travels, a branch lane such as an exit of an expressway or a bypass road, a junction, and the like, the lane width between the lane markers of the diverging lane connecting the branch lane and the main lane, intersections, pedestrian crossways, signals, road signs, and obstacles on the road wall side (an electric pole, a telegraph pole, a parked vehicle and the like).

In addition, the forward traveling environment recognizer 21d of the camera unit 21 is coupled to the input side of the automatic driving control unit 26, and the automatic driving control unit 26 is also coupled to the map locator calculator 12 through an in-vehicle communication line (Controller Area Network: CAN, for example), in a bidirectional communication available state. Furthermore, as a vehicle control system for causing the own vehicle M to travel by automatic driving along the target path to be described later, a steering controller 31 configured to control the advancing direction of the own vehicle M, a brake controller 32 configured to decelerate the own vehicle M by forced brake, an acceleration/deceleration controller 33 configured to control the vehicle speed of the own vehicle M are coupled to the output side of the automatic driving control unit 26. In addition, also the notification device 34, such as a monitor and a speaker, configured to notify the driver of information related to automatic driving is coupled to the output side of the automatic driving control unit 26.

If an automatic driving section (expressway, for example) in which automatic driving control is permitted is set on the traveling route set by the traveling route setting calculator 12b, the automatic driving control unit 26 sets a target path for performing automatic driving in the automatic driving section. Then, in the automatic driving section, the automatic driving control unit 26 controls the steering controller 31, the brake controller 32, and the acceleration/deceleration controller 33 in a predetermined manner such that the lateral position of the own vehicle M coincides with the target path, based on the positioning signal indicating the own vehicle position received by the GNSS receiver 13, to perform automatic driving.

At that time, based on the forward traveling environment recognized by the forward traveling environment recognizer 21d, the automatic driving control unit 26 causes, when a preceding vehicle is detected, the own vehicle M to follow the preceding vehicle, and causes, when no preceding vehicle is detected, the own vehicle M to travel at a set vehicle speed within a regulation speed, under the well-known Adaptive Cruise Control (ACC) and Active Lane Keep (ALK) control. In addition, when the target path is set to the branch lane side which branches from the main lane and the own vehicle performs lane change from the main lane in the direction of the branch lane, the well-known Auto Lane Changing (ALC) control is executed. Under the ALC control, first the own vehicle M is caused to change lane to the traveling lane on the side to which the branch lane is connected (the first lane in FIGS. 5A, 5B, 8A, and 8B), and then caused to change lane automatically in the direction of the branch lane at a predetermined timing.

Figure 5A:
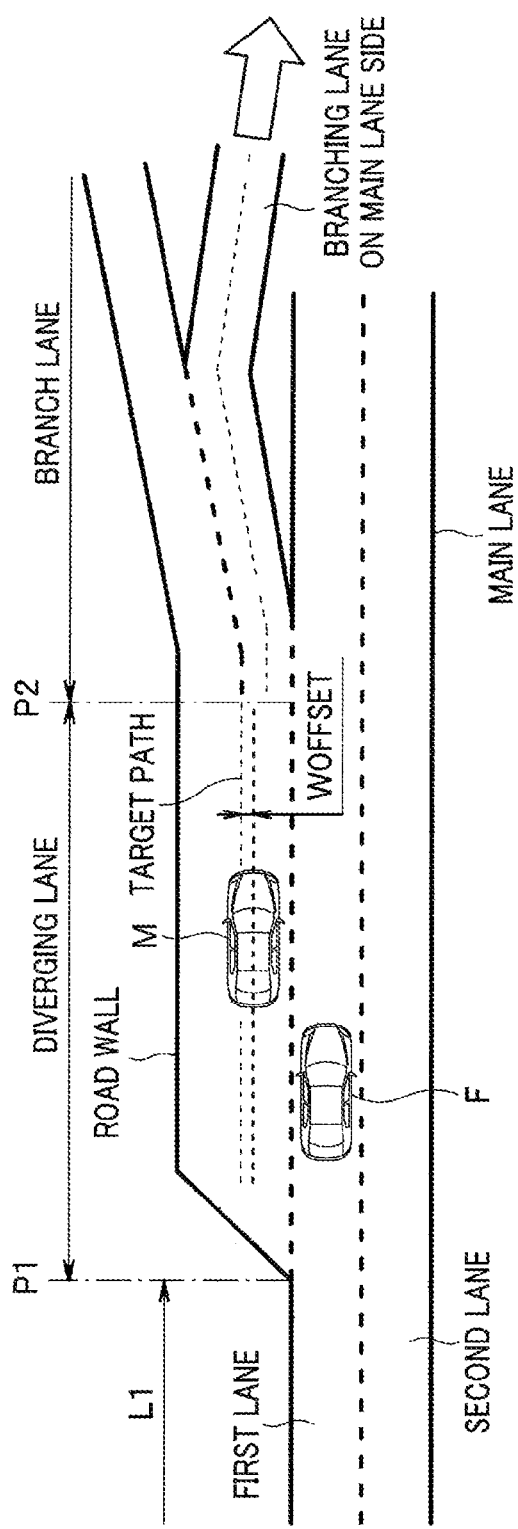
FIG. 5A is an explanatory view illustrating a traveling state on a diverging lane with a wide lane width, in a case where a target path is set to a branching lane on a main lane side of a branch lane.
Figure 5B:
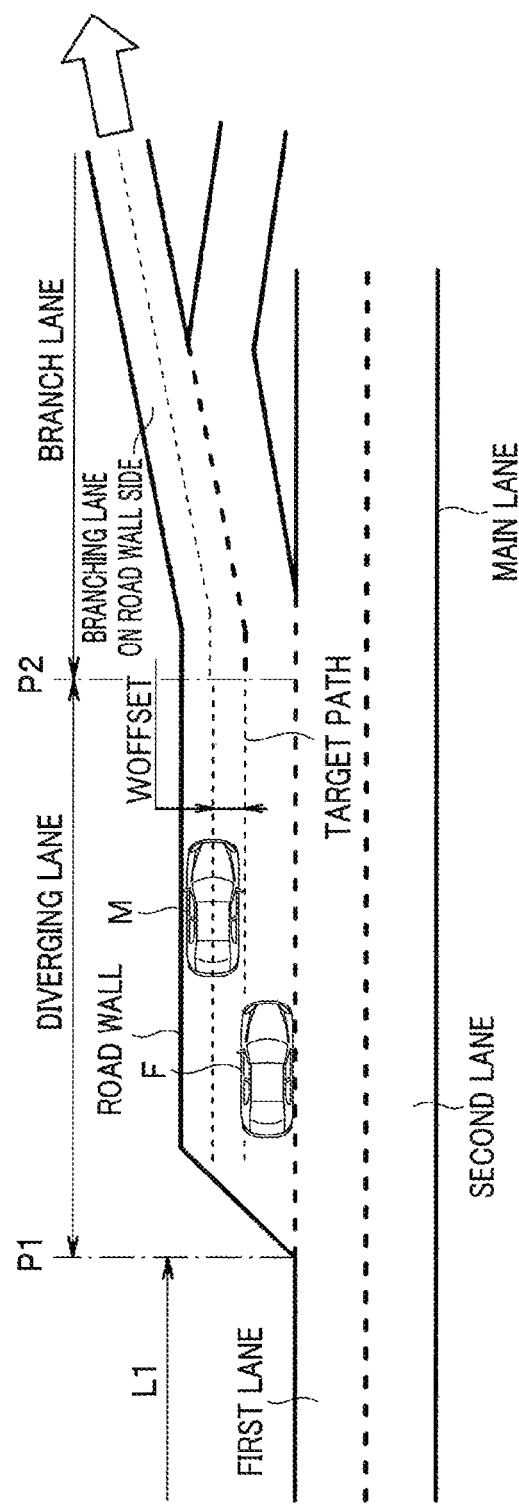
FIG. 5B is an explanatory view illustrating a traveling state on the diverging lane with the wide lane width, in a case where the target path is set to a branching lane on a road wall side of the branch lane.

As illustrated in FIGS. 5A and 5B, or in FIGS. 8A and 8B, if the branch lane is further bifurcated into branching lanes ahead, the main lane and the branch lane are connected to each other through the diverging lane. The diverging lane is provided for enabling a vehicle that has changed lane from the first lane to smoothly advance in the direction of one of the branching lanes of the bifurcated branch lane, and lane markers for guiding in the directions of the respective branching lanes are not clearly drawn on the diverging lane. In some cases, the lane width of the diverging lane is relatively wide in which two vehicles can travel side by side as illustrated in FIGS. 5A and 5B, and in other cases, the lane width is relatively narrow in which two vehicles cannot travel side by side as illustrated in FIGS. 8A and 8B.

If the lane width of the diverging lane is stored in the static information in the dynamic map, the lane width is acquired from the static information. Alternatively, the information on the diverging lane may be acquired from the traveling environment information acquired based on the image picked up by the camera unit 21.

In the conventional technique in which the target path is set to the center of the lane width, even if the diverging lane has a wide lane width in which two vehicles can travel side by side, the center of the lane width of the diverging lane is set as the target path, and the target path is different from the traveling route expected by the driver, which gives a sense of incongruity to the driver. Furthermore, the own vehicle impedes the advancing of a following vehicle that is to advance in the direction of the branching lane different from the advancing direction of the own vehicle M.

In view of the above, the automatic driving control unit 26 is configured to change the lateral position of the target path set on the diverging lane to an optimal lateral position in accordance with the lane width so that the target path continues to the direction of the branching lane toward which the own vehicle M advances. In one embodiment, the change amount of the lateral position of the target path on the diverging lane, which is set by the automatic driving control unit 26, is obtained in the target path lateral position change amount calculation routine illustrated in FIG. 3.

Figure 2:
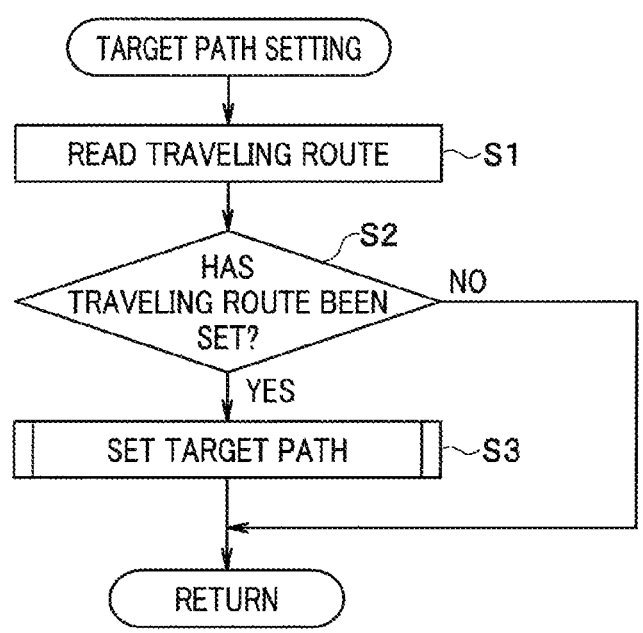
FIG. 2 is a flowchart illustrating a target path setting routine.
Figure 3:
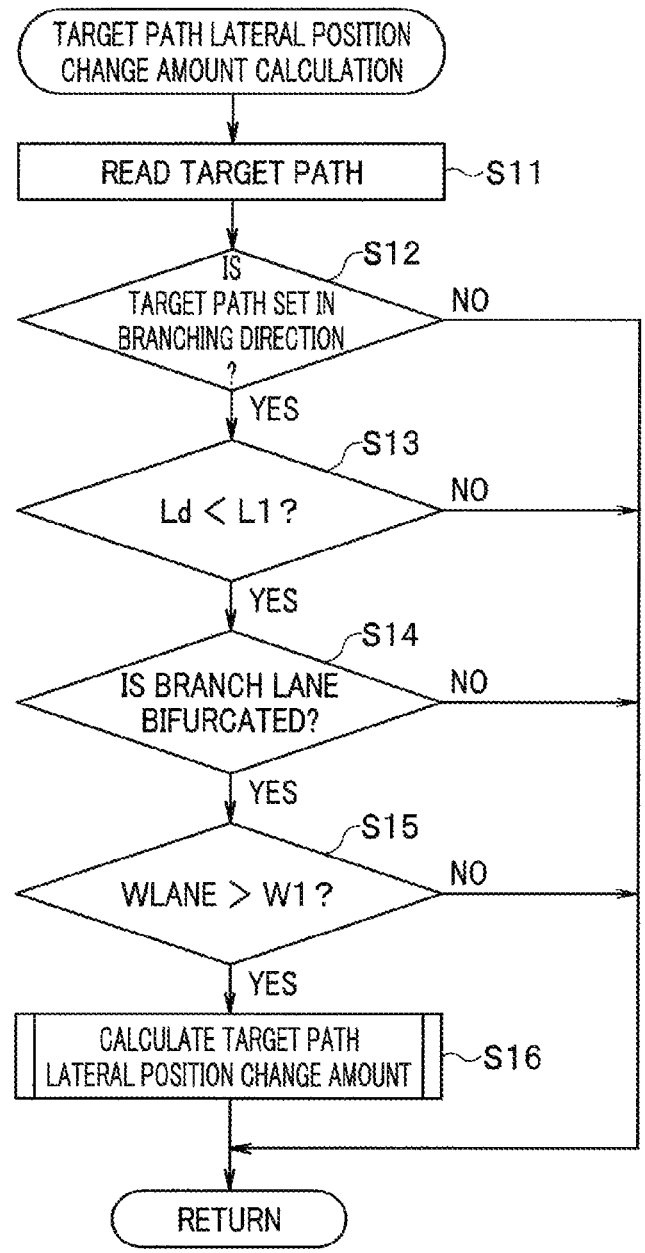
FIG. 3 is a flowchart illustrating a target path lateral position change amount calculation routine.

Before describing the routine illustrated in FIG. 3, description will be briefly made on the processing for setting a target path based on the target path setting routine illustrated in FIG. 2. In the target path setting routine, the target path is set on the traveling route. However, the traveling route set by the traveling route setting calculator 12b changes moment by moment according to the road conditions. Therefore, the routine is repeatedly executed for each predetermined calculation cycle, to thereby acquire the latest traveling route.

When an automatic driving switch, not illustrated, is turned on, the routine illustrated in FIG. 2 is activated, and in step S1, the traveling route, which is set by the traveling route setting calculator 12b of the map locator calculator 12, is read. Next, the procedure proceeds to step S2 to check whether the traveling route is set. When the traveling route has not been set yet, the procedure exits the routine.

On the other hand, when the traveling route is set, the procedure proceeds to step S3, to set, on the set traveling route, the target path along which the own vehicle M is caused to advance by the automatic driving control. Then, the procedure exits the routine. At that time, a lateral position change amount (deviation amount) WOFF for correcting the lateral position of the target path, which is calculated in the target path lateral position change amount calculation routine, is read, and when the deviation amount WOFF is calculated, the target path is corrected with the deviation amount WOFF and a new target path is set in the step S3. Note that, in one embodiment, the processing in the step S3 may corresponds to a "target path setting unit".

Then, the automatic driving control unit 26 controls the respective controllers 31 to 33 to cause the controllers to operate in a predetermined manner such that the lateral position of the own vehicle M coincides with the target path set in the step S3, to execute automatic driving.

The target path to be set in the step S3 is set up to a predetermined distance ahead (3 to 5 kilometers, for example) of the own vehicle M, and set to the center of the lane (traveling lane) on which the own vehicle M travels. As the target path, the control conditions required for causing the own vehicle M to travel automatically along the traveling route without the driver's operation are also set. As the control conditions, it is set that the own vehicle is caused to travel on the center of which of the traveling lanes (if there are two lanes, which of the first traveling lane and the second traveling lane), and when the target path is set in the direction of the branch lane (or the diverging lane), the timing for starting lane change is set.

Note that, if the traveling route is not in the automatic driving section, the automatic driving control routine itself is not activated, and the driver manually drives the own vehicle along the traveling route displayed on the monitor of the car navigation system. In that case, in the traveling in the straight forward direction, the driving assist control is executed under the well-known ACC control and the ALK control.

The target path set in the above-described step S3 is read in the target path lateral position change amount calculation routine illustrated in FIG. 3. The routine is executed for each predetermined calculation cycle after the target path is set in the automatic driving control routine illustrated in FIG. 2. Furthermore, in the target path lateral position change amount calculation routine, when the target path is set in the direction of the branch lane, and the branch lane is connected to the main lane through the diverging lane, the lateral position change amount (deviation amount) for correcting the lateral position of the target path set on the diverging lane in accordance with the advancing direction of the own vehicle M and the lane width of the diverging lane is set. Note that description will be made hereinafter using an aspect in which the main lane includes two lanes and the branch lane is connected to the first lane, for convenience.

That is, first, the target path is read in step S11, and the procedure proceeds to step S12 where it is checked whether the target path is set in the branching direction. If the target path is set in the branching direction, the procedure proceeds to step S13. When the target path is set in the straight forward direction, the procedure exits the routine.

When the procedure proceeds to the step S13, a distance (diverging lane reaching distance) Ld from the current position of the own vehicle M to a branch point P1 (see FIGS. 5A, 5B, 8A, and 8B) which is an entrance to the branch lane side is compared with a lane change timing distance L1. The lane change timing distance L1 is a distance (approximately 70 to 100 meters) at which the own vehicle M is caused to perform lane change from the first lane of the main lane in the branching direction.

In the case of Ld≥L1, since the own vehicle M has not reached the lane change timing, the procedure exits the routine. On the other hand, in the case of Ld<L1, it is determined that the own vehicle M has reached the lane change timing, and the procedure proceeds to step S14. When the own vehicle M reaches the lane change timing, the automatic driving control unit 26 starts lane change by the well-known ALC control, to cause the own vehicle M to perform lane change from the first lane of the main lane in the branching direction.

When the procedure proceeds to step S14, it is checked whether the branch lane ahead of the branch point P2 is bifurcated into branching lanes with reference to the static information in the dynamic map. When the branch lane is not bifurcated, since no diverging lane is provided, the procedure exits the routine. On the other hand, when the branch lane is bifurcated into branching lanes, it is determined that the main lane and the branch lane are connected to each other through the diverging lane, and the procedure proceeds to step S15. Note that, in one embodiment, the processing in the step S12 and the processing in the step S14 may correspond to a "branch lane determiner".

In the step S15, the lane width of the diverging lane (diverging lane width) WLANE is compared with a lateral position change amount calculation determination value W1. The lateral position change amount calculation determination value W1 is a value for determining whether it is necessary to calculate the lateral position change amount (deviation amount), and W1 corresponds to a lane width (approximately 3 to 4 meters) of a normal one lane.

In addition, the diverging lane width WLANE is a distance between the lane markers drawn respectively on the road wall side and the main lane side, and acquired from the static information in the dynamic map. In one embodiment, the static information may correspond to a "road condition acquirer". Alternatively, if the width between the lane markers can be recognized from the traveling environment information obtained based on the image picked up by the camera unit 21, the diverging lane width WLANE may be obtained based on the traveling environment information. In one embodiment, the camera unit 21 may serve as to a "road condition acquirer".

Then, in the case of WLANE≤W1, since there is no need for obtaining the lateral position change amount, the procedure exits the routine. As a result, the target path set to the center of the lane, which has been obtained in the step S3 in FIG. 2, is applied.

On the other hand, in the case of WLANE>W1, the procedure proceeds to step S16. In the step S16, the lateral position change amount (deviation amount) WOFF for correcting the lateral position of the target path set on the diverging lane is calculated. Note that the target path is set to the center of the diverging lane width (WLANE/2), and the deviation amount WOFF is the lateral position change amount, with the target path as a reference (WOFF=0). In this case, in the present embodiment, the deviation amount WOFF on the lane side with respect to the target path is expressed as a positive value (plus), and the deviation amount WOFF on the road wall side with respect to the target path is expressed as a negative value (minus). In addition, in one embodiment, the processing in the step S16 corresponds to a "target path lateral position change amount calculator".

Figure 4:
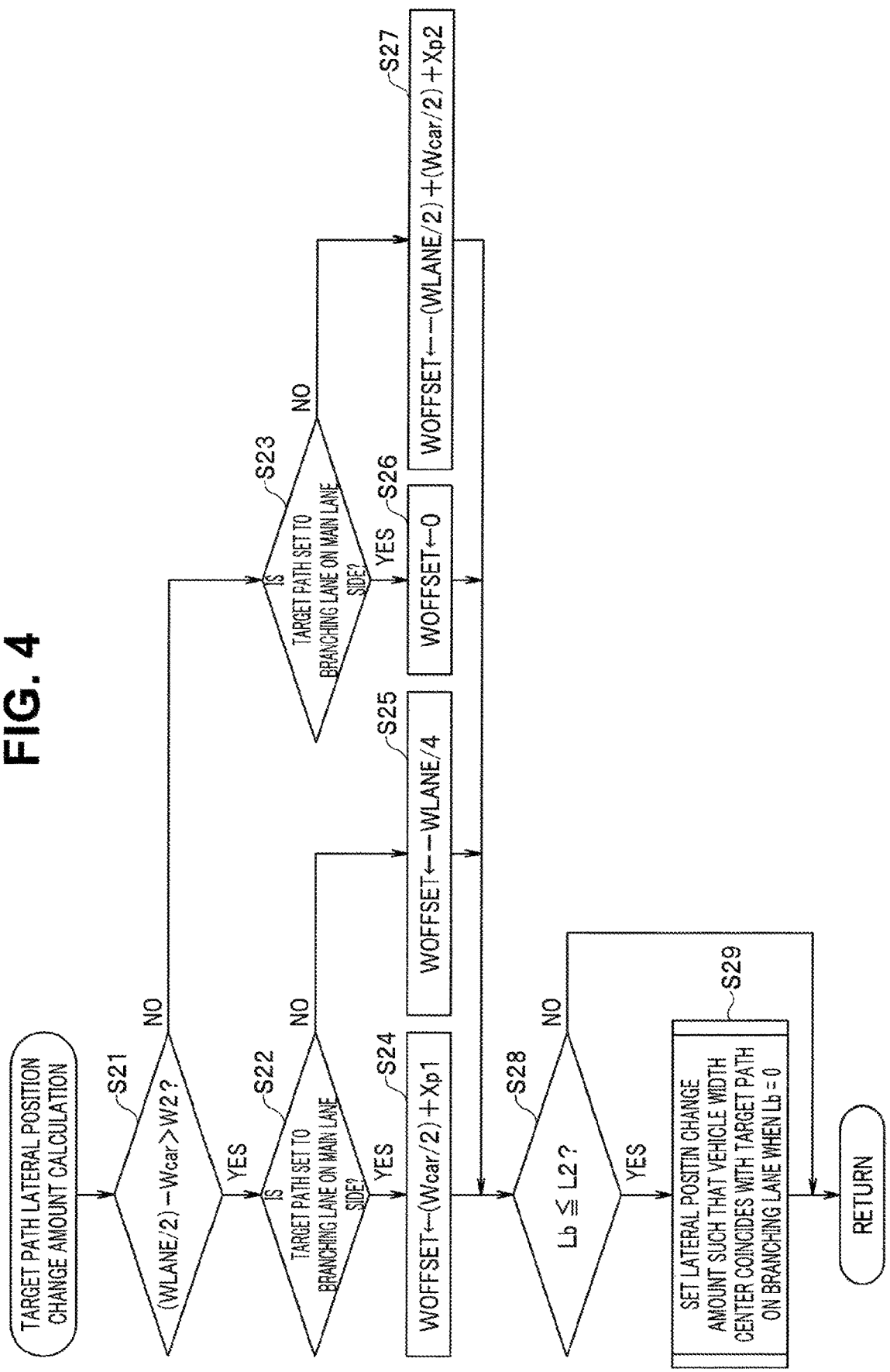
FIG. 4 is a flowchart illustrating a target path lateral position change amount calculation subroutine.

The lateral position change amount is calculated in the target path lateral position change amount calculation subroutine illustrated in FIG. 4. In the subroutine, first in step S21, it is checked whether the diverging lane has a lane width in which two vehicles can travel side by side, based on the relation between the diverging lane width WLANE and the vehicle widths of the vehicles. In the present embodiment, the own vehicle M is supposed to be a passenger vehicle and the vehicle width Wcar is set to approximately 1.8 meters. However, the vehicle width is not limited to such an example. In one embodiment, the processing in the step S21 may correspond to a "branching lane width determiner".

First, the diverging lane width WLANE is divided into two lanes, to obtain a lane width per one lane (WLANE/2), and subtract the vehicle width Wcar from the lane width (WLANE/2), to calculate an allowance width ((WLANE/2)−Wcar) of the branching lane width with respect to the own vehicle M. Then, comparison is made between the allowance width and an allowance width determination value W2 (approximately 0.2 to 0.5 meters).

In the case of (WLANE/2)−Wcar>W2, it is determined that two vehicles can travel side by side, and the procedure proceeds to step S22. In the case of (WLANE/2)−Wcar W2, there is no space for two vehicles traveling side by side, the procedure branches to step S23.

When the procedure proceeds to step S22, it is checked whether the branching lane to which the target path is set is on the main lane side. If the target path is set to the branching lane on the main lane side, the procedure proceeds to step S24. If the target path is set to the branching lane on the road wall side, which is opposite side of the main lane, the procedure branches to step S25. In one embodiment, the processing in the step S22 and the processing in step S23 to be described later may correspond to a "target path determiner".

Figure 6A:
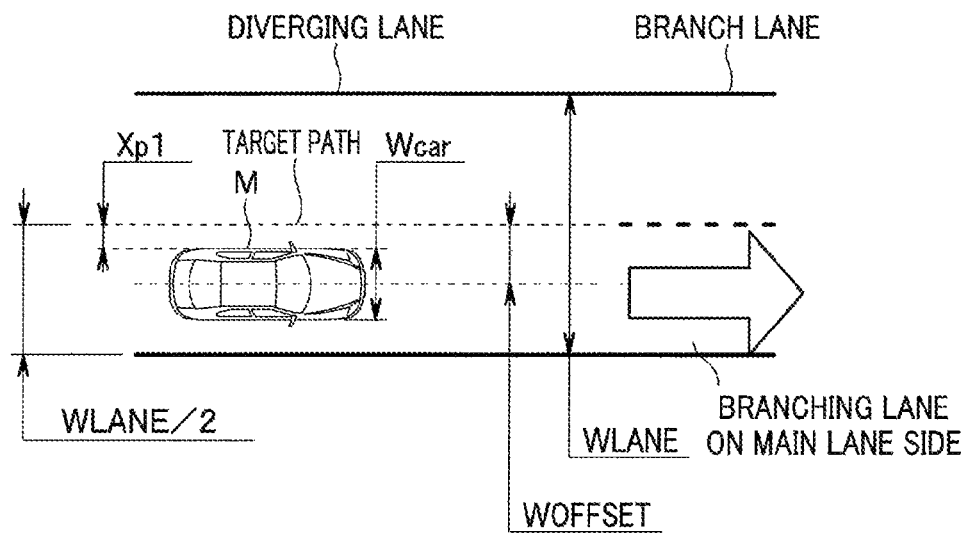
FIG. 6A is an explanatory view illustrating a setting state of the target path on the diverging lane in FIG. 5A.

When the procedure proceeds to step S24, the deviation amount WOFF for causing the own vehicle to advance to the branching lane on the main lane side is calculated based on the expression WOFF←(Wcar/2)+Xp1 (see FIG. 6A), and the procedure proceeds to step S28. In the expression, Wcar/2 represents the vehicle width center of the own vehicle M, and Xp1 represents a main lane side lateral position correction amount. In one embodiment, the processing in the step S24 may correspond to a "first lateral position change amount calculator".

The main lane side lateral position correction amount Xp1 is a variable value set based on a distance (branch lane reaching distance) Lb from the own vehicle position of the own vehicle M to the branch point P2 which is an entrance of the branch lane. In the present embodiment, as illustrated in FIGS. 5A, 5B, 8A, and 8B, the branch point P2 is set to a position where drawing of the lane markers marking the branching lanes is started. This is because the target path is set to the center of each of the branching lanes at a position where the lane markers are drawn. In addition, the section between the branch points P1 to P2 is set as the diverging lane.

As illustrated in FIG. 5A, when the target path is set to the branching lane on the main lane side, the driver driving the own vehicle M by manual driving, for example, intends to cause the own vehicle M to travel along the main lane side. At that time, when detecting that a following vehicle F traveling on the first lane of the main lane comes close to the own vehicle M, the driver predicts that the following vehicle F may cut in front of the own vehicle M. Therefore, the driver causes the own vehicle M to travel, while intentionally moving the own vehicle to the center side. Furthermore, the possibility that the following vehicle F cuts in becomes lower as the branch lane reaching distance Lb becomes shorter.

Figure 7:
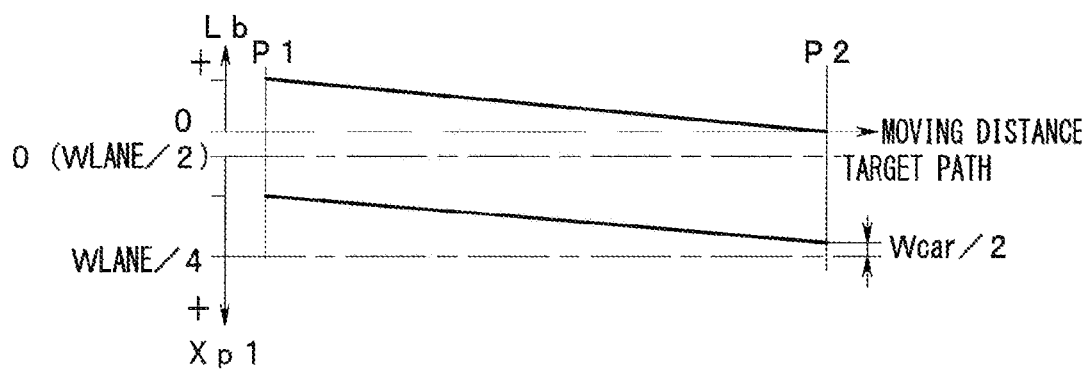
FIG. 7 is a characteristic diagram illustrating a main lane side lateral position correction amount relative to the target path, which is set according to a distance to an entrance of the branch lane.

Therefore, as illustrated in FIG. 7, the main lane side lateral position correction amount Xp1 is set to a value such that the initial value at the branch point P1 is the minimum value and the vehicle width center (Wcar/2) of the own vehicle M becomes one-fourth of the diverging lane width WLANE when the own vehicle reaches the branch point P2. In this case, the section of the diverging lane (P1 to P2) differs from one road to another. However, if values of the main lane side lateral position correction amount Xp1 at the branch points P1 and P2 are fixed values as illustrated in FIG. 7, a proper main lane side lateral position correction amount Xp1 according to the branch lane reaching distance Lb can be obtained by setting an inclination of the line connecting the branch points P1 and P2.

Figure 6B:
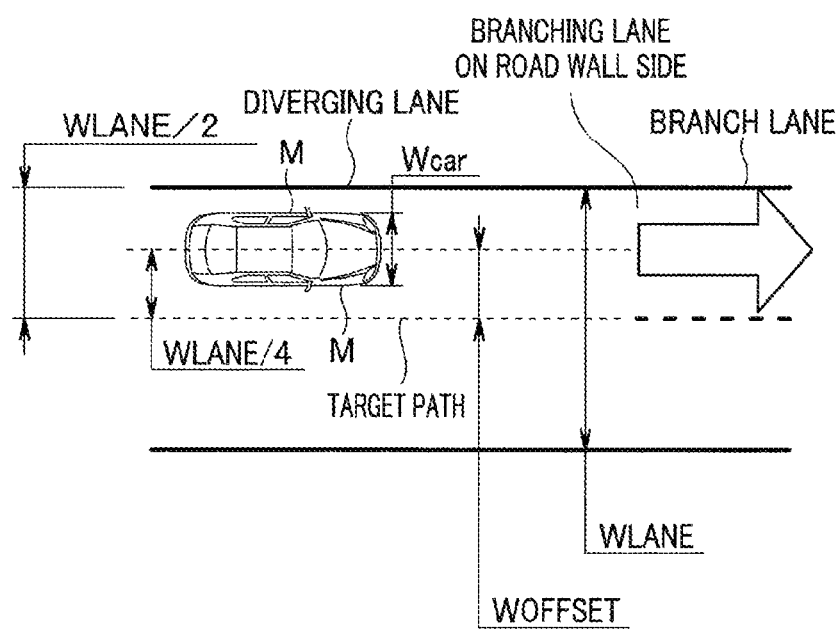
FIG. 6B is an explanatory view illustrating a setting state of the target path on the diverging lane in FIG. 5B.

When the procedure branches from the step S22 to step S25, the deviation amount WOFF for causing the own vehicle to advance to the branching lane on the road wall side is calculated based on WOFF←−WLANE/4 (see FIG. 6B), and the procedure proceeds to step S28. When entering into the branching lane on the road wall side, the own vehicle M is caused to travel along the road wall side. However, since the possibility that the following vehicle cuts in front of the own vehicle M from the main lane side is considered to be low, the own vehicle M is caused to travel on the center of the half of the diverging lane width WLANE (WLANE/4). In one embodiment, the processing in the step S25 may correspond to a "second lateral position change amount calculator".

On the other hand, when the procedure branches from the step S21 to step S23, it is checked whether the branching lane to which the target path is set is on the main lane side. When the target path is set to the branching lane on the main lane side, the procedure proceeds to step S26. When the target path is set to the branching lane on the road wall side, the procedure branches to step S27.

Figure 9A:
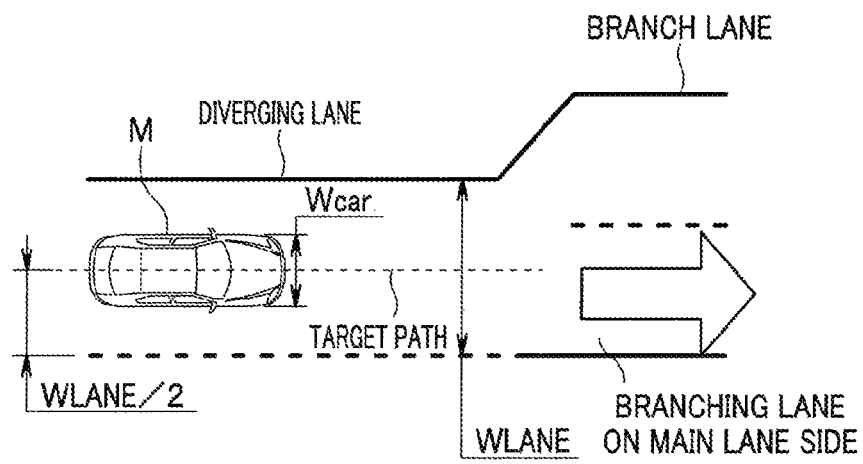
FIG. 9A is an explanatory view illustrating a setting state of the target path on the diverging lane in FIG. 8A.

When the procedure proceeds to the step S26, the deviation amount WOFF is set to be zero, that is, without deviating the target path as illustrated in FIG. 8A and FIG. 9A, the procedure proceeds to step S28. Therefore, the processing in the step S26 may be omitted.

Figure 9B:
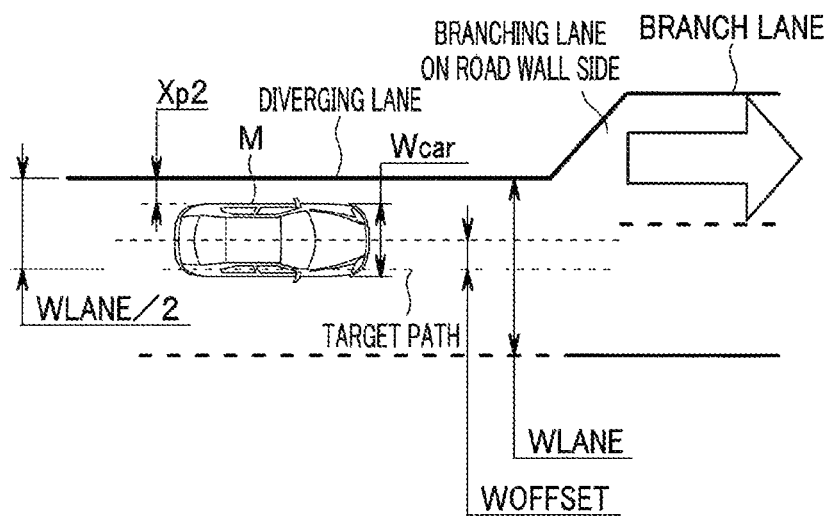
FIG. 9B is an explanatory view illustrating a setting state of the target path on the diverging lane in FIG. 8B.

When the procedure branches to step S27, the deviation amount WOFF is calculated based on the expression, WOFF←−(WLANE/2)+(Wcar/2)+Xp2 (see FIGS. 8B and 9B), and the procedure proceeds to the step S28.

In the expression, Xp2 represents a road wall side lateral position correction amount. When the target path is set to the branching lane on the road wall side, it is desirable to cause the own vehicle to travel along the side closer to the road wall as much as possible so as to cause the own vehicle to smoothly enter into the branching lane on the road wall side. However, in the actual traveling, a certain allowance width from the road wall has to be ensured. Therefore, if a road shoulder having a certain width exists on the road wall side, the road wall side lateral position correction amount Xp2 may be set to a small value. In one embodiment, the processing in the step S27 may correspond to a "third lateral position change amount calculator".

When the procedure proceeds to step S28 from any one of the steps S24 to S27, it is checked whether the branch lane reaching distance Lb from the own vehicle portion to the branch point P2 reaches a lateral position change amount correction distance L2 (50 to 100 meters, for example) which has been set in advance. If the branch lane reaching distance Lb has not reached the lateral position change amount correction distance L2 (Lb>L2) yet, the procedure exits the routine.

On the other hand, when the branch lane reaching distance Lb has reached the lateral position change amount correction distance L2 (Lb≤L2), the procedure proceeds to step S29. In the step S29, at the branch point P2, the lateral position change amount (deviation amount) WOFF for making the vehicle width center of the own vehicle M coincide with the target path set to one of the branching lanes is obtained, and the procedure exits the routine. In one embodiment, the processing in the step S29 may correspond to a "transitional lateral position change amount setting unit".

Figure 10A:
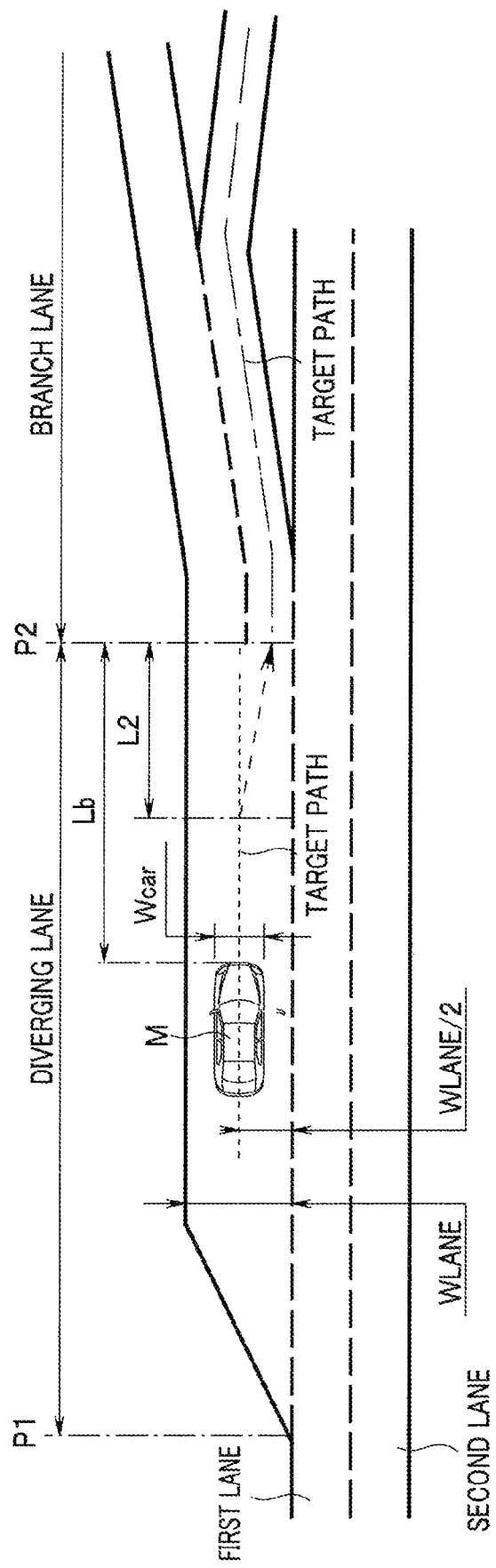
FIG. 10A is an explanatory view illustrating a state where the target path at a time of advancing from the diverging lane with the narrow lane width to the branch lane is corrected in a direction of the branching lane on the main lane side.
Figure 10B:
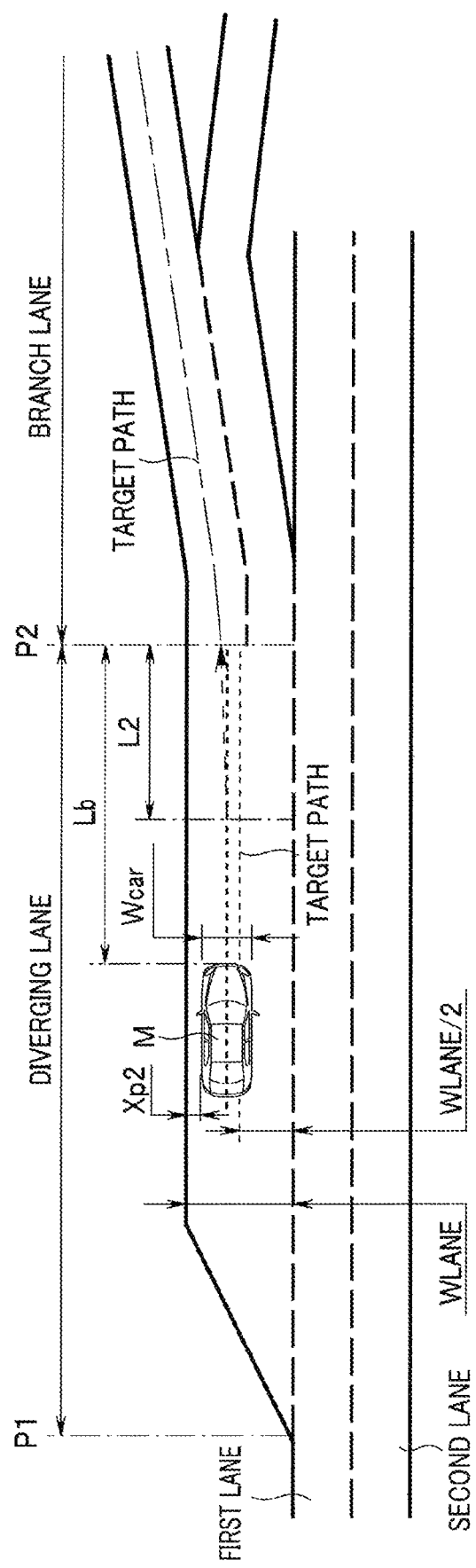
FIG. 10B is an explanatory view illustrating a state where the target path at the time of advancing from the diverging lane with the narrow lane width to the branch lane is corrected in a direction of the branching lane on the road wall side.

The deviation amount WOFF is obtained for each calculation cycle. In either one of the case where the target path is set to the branching lane on the main lane side (see FIG. 10A) and the case where the target path is set to the branching lane on the road wall side (see FIG. 10B), based on the deviation amount WOFF, the automatic driving control unit 26 transmits, to the steering controller 31, a steering signal for causing the own vehicle M to advance, as illustrated by the arrow, toward the target path set to the lane width center of either of the branching lanes set at the branch point P2, from the time when the own vehicle M reaches the lateral position change amount correction distance L2 (Lb≤L2). As a result, it is possible to smoothly guide the own vehicle M in the direction of the target path set to one of the branching lanes of the bifurcated branch lane.

Each of the automatic driving control unit 26 and the map locator calculator 12 illustrated in FIG. 1 can be implemented by the aforementioned microcomputer, and also by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator calculator 12 including the own vehicle position estimation calculator 12a and the traveling route setting calculator 12b, and the automatic driving control unit 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although an embodiment of the technology has been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As described above, according to the technology, when the target path along which the own vehicle M is caused to travel by automatic driving is set to one of the branching lanes of the bifurcated branch lane, according to the lane width of the diverging lane connecting the main lane and the bifurcated branch lane, the lateral position change amount of the center in the vehicle width direction of the own vehicle M relative to the target path is calculated, the lateral position change amount being a lateral position change amount on the side of the branching lane to which the target path is set, to correct the target path with the lateral position change amount, and a new target path is set. That is, when the own vehicle M is caused to travel by automatic driving from the first lane of the main lane toward one of the branching lanes of the bifurcated branch lane via the diverging lane, the target path is set on the diverging lane based on the lane width of the diverging lane and the direction of the branching lane in which the own vehicle M advances. Therefore, even if the lane markers for guiding to the direction of each of the branching lanes are not clearly drawn on the diverging lane, an appropriate target path can be set on the diverging lane, and stable traveling performance can be obtained when the own vehicle enters from the diverging lane to each of the branching lanes. Therefore, it is possible to obtain a traveling state fit to the intention of the occupant including the driver.

Furthermore, the target path corresponding to the direction of the branching lane to which the own vehicle M advances is set, which prevents the own vehicle M from impeding the advancing of the following vehicle F that is to advance in the direction of the branching lane different from the one to which the own vehicle M advances.

Note that the technology is not limited to the above-described embodiments, and it is needless to say that the technology can be applied also to the case where the diverging lane is connected with the second lane, or to the case where the diverging lane is connected with the third lane, when the road has three lanes, for example.

The invention claimed is:

1. An automatic driving assist apparatus for a vehicle comprising:
   a map information storage unit configured to store road map information;
   an own vehicle position estimator configured to estimate an own vehicle position that is a current position of the own vehicle;
   a route information input unit configured to receive an input of information of a destination by an operation from outside;
   a traveling route setting unit configured to set a traveling route connecting the own vehicle position estimated by the own vehicle position estimator and the destination input from the route information input unit, on a basis of the road map information stored in the map information storage unit;
   a target path setting unit configured to set a target path along which the own vehicle is caused to travel by automatic driving, on the traveling route set by the traveling route setting unit such that the target path is set to a center of a traveling lane;
   an automatic driving controller configured to perform automatic driving while controlling a lateral position of the own vehicle such that the lateral position of the own vehicle coincides with the target path set by the target path setting unit; and
   a road condition acquirer configured to acquire a road condition of the traveling lane on which the target path is set,
   wherein the automatic driving controller comprises:
      a branch lane determiner configured to determine whether the target path set by the target path setting unit is set to one of branching lanes of a bifurcated branch lane; and
      a target path lateral position change amount calculator configured to, when the branch lane determiner determines that the target path is set to the one of the branching lanes of the bifurcated branch lane, calculate a lateral position change amount of a center in a vehicle width direction of the own vehicle relative to the target path, according to a lane width of a diverging lane connecting a main lane and the bifurcated branch lane, the lateral position change amount being a lateral position change amount on a side of the one of the branching lanes to which the target path is set,
   wherein the target path setting unit corrects the target path with the lateral position change amount calculated by the target path lateral position change amount calculator, to set a new target path,
   wherein the target path lateral position change amount calculator further comprises:
      a branching lane width determiner configured to compare an allowance width with an allowance width determination value set in advance, the allowance width being obtained by subtracting a vehicle width of the own vehicle from one-half of the lane width of the diverging lane;
      a target path determiner configured to determine whether the target path set by the target path setting unit is set to a direction of a branching lane on a main lane side of the bifurcated branch lane; and
      a third lateral position change amount calculator configured to, when the branching lane width determiner determines that the allowance width is narrower than the allowance width determination value and the target path determiner determines that the target path is set to a direction of a branching lane on a road wall side of the bifurcated branch lane, the road wall side being opposite to the main lane side, calculate the lateral position change amount by subtracting, from one-half of the lane width of the diverging lane, a value obtained by adding one-half of the vehicle width of the own vehicle to a lateral position correction amount set in advance with respect to a road wall.

2. The automatic driving assist apparatus for a vehicle according to claim 1, wherein the target path lateral position change amount calculator further comprises:
   a target path determiner configured to determine whether the target path set by the target path setting unit is set to a direction of a branching lane on a main lane side of the bifurcated branch lane; and
   a first lateral position change amount calculator configured to, when the target path determiner determines that the target path is set to the direction of the branching lane on the main lane side, set the lateral position change amount relative to the target path by adding a predetermined lateral position correction amount to a length to a center of the own vehicle in the vehicle width direction of the own vehicle.

3. The automatic driving assist apparatus for a vehicle according to claim 2, wherein the lateral position correction amount is set, with an initial value at an entrance of the diverging lane being as a minimum value, to be a value such that a midpoint of a vehicle width of the own vehicle becomes one-fourth of the lane width of the diverging lane when the own vehicle reaches from the entrance of the diverging lane to an entrance of the bifurcated branch lane.

4. The automatic driving assist apparatus for a vehicle according to claim 3, wherein the target path lateral position change amount calculator further comprises:
   a transitional lateral position change amount setting unit configured to set the lateral position change amount for making a midpoint of the vehicle width of the own vehicle coincide with the target path set to one of the branching lanes, as the own vehicle gets close to the one of the branching lanes to which the target path is set.

5. The automatic driving assist apparatus for a vehicle according to claim 2, wherein the target path lateral position change amount calculator further comprises:
   a transitional lateral position change amount setting unit configured to set the lateral position change amount for making a midpoint of a vehicle width of the own vehicle coincide with the target path set to one of the branching lanes, as the own vehicle gets close to the one of the branching lanes to which the target path is set.

6. The automatic driving assist apparatus for a vehicle according to claim 1, wherein the target path lateral position change amount calculator further comprises:
   a target path determiner configured to determine whether the target path set by the target path setting unit is set to a direction of a branching lane on a main lane side of the bifurcated branch lane; and
   a second lateral position change amount calculator configured to, when the target path determiner determines that the target path is set to a direction of a branching lane on a road wall side of the bifurcated branch lane, the road wall side being opposite to the main lane side, set the lateral position change amount to a position of one-fourth of the lane width of the branching lane.

7. The automatic driving assist apparatus for a vehicle according to claim 6, wherein the target path lateral position change amount calculator further comprises:
   a transitional lateral position change amount setting unit configured to set the lateral position change amount for making a midpoint of the vehicle width of the own vehicle coincide with the target path set to one of the branching lanes, as the own vehicle gets close to the one of the branching lanes to which the target path is set.

8. The automatic driving assist apparatus for a vehicle according to claim 1, wherein the target path lateral position change amount calculator further comprises:
   a transitional lateral position change amount setting unit configured to set the lateral position change amount for making a midpoint of a vehicle width of the own vehicle coincide with the target path set to one of the branching lanes, as the own vehicle gets close to the one of the branching lanes to which the target path is set.

9. An automatic driving assist apparatus for a vehicle comprising a circuitry, the circuitry being configured to:
   estimate an own vehicle position that is a current position of the own vehicle;
   receive an input of information of a destination by an operation from outside;
   set a traveling route connecting the estimated own vehicle position and the input destination, on a basis of road map information stored in a map information storage unit;
   set a target path along which the own vehicle is caused to travel by automatic driving, on the set traveling route such that the target path is set to a center of a traveling lane; and
   perform automatic driving while controlling a lateral position of the own vehicle such that the lateral position of the own vehicle coincides with the set target path,
   wherein the circuitry is further configured to:
      acquire a road condition of the traveling lane on which the target path is set;
      determine whether the set target path is set to one of branching lanes of a bifurcated branch lane;
      calculate, when determining that the target path is set to the one of the branching lanes of the bifurcated branch lane, a lateral position change amount of a center in a vehicle width direction of the own vehicle relative to the target path, according to a lane width of a diverging lane connecting a main lane and the bifurcated branch lane, the lateral position change amount being a lateral position change amount on a side of the one of the branching lanes to which the target path is set; and
      correct the target path with the calculated lateral position change amount, to set a new target path, and
   wherein the circuitry is further configured to:
      compare an allowance width with an allowance width determination value set in advance, the allowance width being obtained by subtracting a vehicle width of the own vehicle from one-half of the lane width of the diverging lane,
      determine whether the target path is set to a direction of a branching lane on a main lane side of the bifurcated branch lane; and
      when the allowance width is narrower than the allowance width determination value and the target path determiner determines that the target path is set to a direction of a branching lane on a road wall side of the bifurcated branch lane, the road wall side being opposite to the main lane side, calculate the lateral position change amount by subtracting, from one-half of the lane width of the diverging lane, a value obtained by adding one-half of the vehicle width of the own vehicle to a lateral position correction amount set in advance with respect to a road wall.

10. An automatic driving assist apparatus for a vehicle, the automatic driving assist apparatus comprising a circuitry, the circuitry being configured to:
   estimate an own vehicle position that is a current position of the own vehicle;
   receive an input of information of a destination by an operation from outside;
   set a traveling route connecting the estimated own vehicle position and the input destination, on a basis of road map information stored in a map information storage unit;
   set a target path along which the own vehicle is caused to travel by automatic driving, on the set traveling route such that the target path is set to a center of a traveling lane; and
   perform automatic driving while controlling a lateral position of the own vehicle such that the lateral position of the own vehicle coincides with the set target path,
   wherein the circuitry is further configured to, when 1) the own vehicle is traveling in a main lane, 2) the target path is set on a bifurcated branch lane branching from the main lane toward a first direction, 3) the target path is set on a diverging lane that is located along a first direction side of the main lane and connected to the bifurcated branch lane, and 4) the bifurcated branch lane is further bifurcated into two branching lanes, set a target lateral position of the target path at a time when a lane change of the own vehicle from the main lane to the diverging lane is completed, based on the target path and a lane width of the diverging lane.

11. The automatic driving assist apparatus for a vehicle according to claim 10,
   wherein the two branching lanes consist of a first branching lane branching from the bifurcated branch lane toward the first direction and a second branching lane branching from the bifurcated branch lane toward a second direction opposite to the first direction, and
   wherein, in a case where the lane width of the diverging lane is greater than a predetermined width and the diverging lane does not have lane markers that divide the diverging lane in two, the circuitry is configured to:
      when the target path is set on the first branching lane, set the target lateral position to a first target position where a whole of the own vehicle is located in the first direction from a center of the diverging lane; and
      when the target path is set on the second branching lane, set the target lateral position to a second target position where a whole of the own vehicle is located in the second direction from the center of the diverging lane.

12. The automatic driving assist apparatus for a vehicle according to claim 11, wherein the circuitry sets the first target position at a position separated from the center of the diverging lane by one-fourth of the width of the diverging lane in the first direction, and wherein the circuitry sets the second target position at a position separated from the center of the diverging lane by a distance smaller than one-fourth of the width of the diverging lane in the second direction.

13. The automatic driving assist apparatus for a vehicle according to claim 12, wherein the circuitry sets the second target position so that the center of the diverging lane and the own vehicle are separated by a predetermined first distance.

14. The automatic driving assist apparatus for a vehicle according to claim 13, wherein in a case where the lane width of the diverging lane is equal to or smaller than the predetermined width, the circuitry is configured to:
   when the target path is set on the first branching lane, set the target lateral position to a third target position where a center of the own vehicle is located in the first direction from the center of the diverging lane so that an edge of the diverging lane in the first direction and the own vehicle are separated by a predetermined second distance, and
   when the target path is set on the second branching lane, set the target lateral position to a fourth target position where a center of the own vehicle is located on the center of the diverging lane.

15. The automatic driving assist apparatus for a vehicle according to claim 12, wherein in a case where the lane width of the diverging lane is equal to or smaller than the predetermined width, the circuitry is configured to:
   when the target path is set on the first branching lane, set the target lateral position to a third target position where a center of the own vehicle is located in the first direction from the center of the diverging lane so that an edge of the diverging lane in the first direction and the own vehicle are separated by a predetermined second distance, and
   when the target path is set on the second branching lane, set the target lateral position to a fourth target position where a center of the own vehicle is located on the center of the diverging lane.

16. The automatic driving assist apparatus for a vehicle according to claim 11, wherein in a case where the lane width of the diverging lane is equal to or smaller than the predetermined width, the circuitry is configured to:
   when the target path is set on the first branching lane, set the target lateral position to a third target position where a center of the own vehicle is located in the first direction from the center of the diverging lane so that an edge of the diverging lane in the first direction and the own vehicle are separated by a predetermined second distance, and
   when the target path is set on the second branching lane, set the target lateral position to a fourth target position where a center of the own vehicle is located on the center of the diverging lane.

\* \* \* \* \*